US005949973A

United States Patent [19]

Yarom

[11] Patent Number: 5,949,973
[45] Date of Patent: Sep. 7, 1999

[54] METHOD OF RELOCATING THE STACK IN A COMPUTER SYSTEM FOR PREVENTING OVERRATE BY AN EXPLOIT PROGRAM

[75] Inventor: Yuval Yarom, Ramat Hasharon, Israel

[73] Assignee: Memco Software, Ltd., Tel Aviv, Israel

[21] Appl. No.: 08/900,518

[22] Filed: Jul. 25, 1997

[51] Int. Cl.[6] .................................................. G06F 12/14
[52] U.S. Cl. .......................................... 395/186; 395/670
[58] Field of Search .................................. 395/670, 186, 395/187.01, 188.01; 380/4.25

[56] References Cited

PUBLICATIONS

"Smashing the Stack for Fun and Profit", Markus Hubner, pp. 1–29 Nov. 8, 1996.
Forrest, Stephanie et al., *Building Diverse Computer Systems*, Proceedings of the 1997 6th Workshop on Hot Topics in Operating Systems, May 5, 1997.

*Primary Examiner*—Richard L. Ellis
*Attorney, Agent, or Firm*—McDermott, Will & Emery

[57] ABSTRACT

A stack override prevention method provides protection against a computer attack that utilizes the technique of stack override to gain control of a computer system. The method of the protection is to permit the stack to be executable but to add functionality that blocks the possibility of passing control via stack override to code inserted into the stack by means of the exploit program. This method includes relocating the entire stack to a random memory location in memory and subsequently erasing the old stack area. By moving the entire stack associated with a process to a random location, the attacker cannot predict the address in which potentially all permitting code resides and thus cannot put the correct value in the location of the return address within the stack frame. The invention is applicable to operating systems which use the stack as means for passing control to and returning from functions and in which the stack is executable.

9 Claims, 6 Drawing Sheets

METHOD OF RELOCATING THE STACK IN A COMPUTER SYSTEM FOR PREVENTING OVERRATE BY AN EXPLOIT PROGRAM

FIELD OF THE INVENTION

The present invention relates generally to computer operating systems and more particularly relates to a method of preventing stack override within the kernel portion of a computer operating system.

BACKGROUND OF THE INVENTION

Presently, there are numerous operating systems (OSs) which are designed for use in various types of computer systems. A high percentage of the operating systems currently in use are vulnerable to corruption, security breaches and other misuse either by intentional or unintentional means. One way of corrupting the execution of a computer is to corrupt the execution stack within the operating system. For example, a skilled hacker can write past the end of an array which was previously declared as an automatic variable in a routine. This form of corruption is commonly known as stack override, buffer overflow, smashing the stack, trashing the stack, mangling the stack and others.

The technique of stack override is a sophisticated technique for attacking and bypassing software security mechanisms of the operating system. Stack override can be described as exploitation of a weakness detected in one or more system utilities so as to gain unlimited access to virtually all areas within the operating system including data, processes or applications that are running on the system. The technique of stack overriding (including how to detect weaknesses in system utilities and how to build an exploit program) is explained in more detail in 'Smashing the Stack for Fun and Profit,' Phrack Magazine, Volume 49.

Weaknesses in a system utility, or any other piece of code, are typically caused by careless programming. These weaknesses are surprisingly very common and, as it turns out, very easy to exploit. The mechanism and operation of computer programs that utilize stack override to corrupt and abuse a computer system have been discussed at length in the prior art and especially on public sites on the Internet. Despite extensive discussions on the subject, an acceptable solution to the problem has not been offered.

Figure 1:
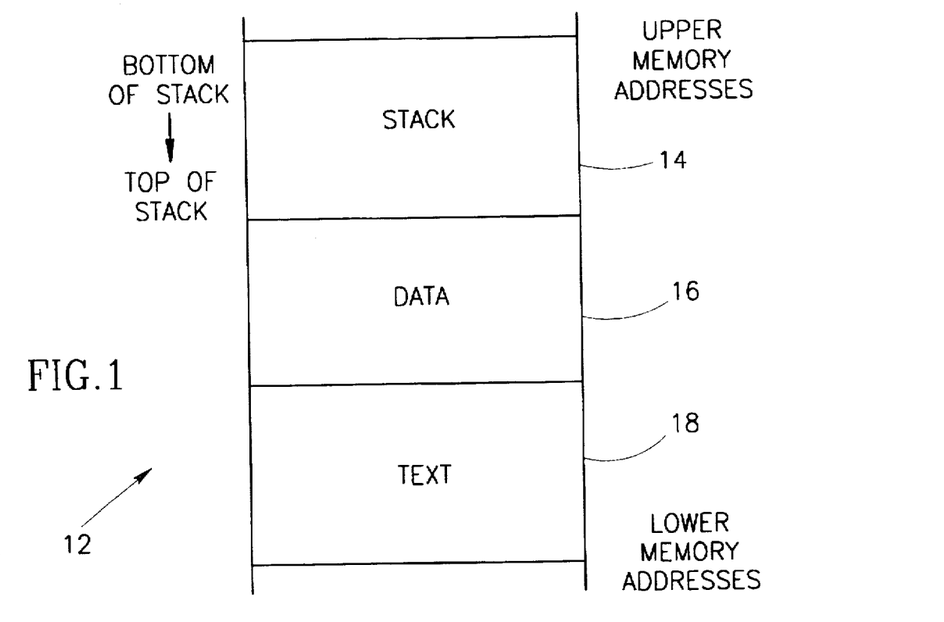
FIG. 1 is a high level logical block diagram illustrating a memory map for a typical computer operating system.

A high level logical block diagram illustrating a memory map for a process in a typical computer operating system is shown in FIG. 1. Most processes that execute in a computer system are divided into three types of regions within the memory 12 of the computer. The three regions are referred to as text 18, data 16 and stack 14 regions. The size of the text region 18 is in accordance with the program and comprises both processor instructions (code) and read only data. The text region corresponds to the text section of an executable file. In addition, the text region is typically marked as read only and any attempt to write into it results in a segmentation violation. The data region 16 comprises both initialized and uninitialized data and functions to store variables declared in the program. The data region corresponds to the data-bss sections of the executable file.

The stack region 14 is a data structure that is extensively used by the majority of commonly available operating systems. The stack is basically a contiguous block of memory (i.e., a buffer, that is written to and read from in a particular manner). A stack is an abstract data type that has the property that the last item placed on the stack is the first item to be removed. This type of queue is commonly known as last in first out (LIFO) queue. Two key operations that can be performed on stacks include PUSH and POP. A PUSH adds an item to the top of the stack and a POP removes an item from the top of the stack. The bottom of the stack is set to a fixed location while the top of the stack varies as data is pushed onto and popped off of the stack. Depending on the processor implementation, the stack can either grow down towards lower memory addresses or can grow up towards upper memory addresses. Typically, the stack grows down as on Intel, Motorola, SPARC and MIPS processors. In addition, the stack pointer which indicates the current top of the stack may point to the value at the top of the stack or may point to the next available location beyond the top. Typically, the stack pointer indicates the last value written to the top of the stack.

A buffer is a contiguous block of memory in a computer system that contains multiple instances of the same data type. Most of the time, the term buffer is synonymous with the word array. In a typical computer language such as the C programming language, arrays can be declared either static or dynamic. Memory space for static variables are allocated at load time within the data segment. However, dynamic variables are loaded at run time on the stack. Thus, stacks are used to dynamically allocate space for the local variables used in functions, to pass parameters to the function and to return values from the function. A buffer is said to have overflowed when data is written past the edge of the buffer. The terms 'stack based buffer overflow' or 'stack override' refers to writing data onto the stack beyond the boundaries of a stack memory area previously allocated to a particular variable.

In practice, the stack is utilized in many operating systems as a standard mechanism in making function calls. The stack is comprised of logical stack frames that are pushed when a function is called and popped when a function returns. The stack frame is typically comprised of the parameters of the function, its local variables and the data necessary to recover the previous stack frame, which includes the value of the instruction pointer at the time the function call is made. Stack buffers are utilized in making calls to and returning from functions. In addition, stack buffers are used in the allocation of automatic variables. Automatic variables are variables that are local to the internal function which are released as soon as the function processing terminates. Thus, the return address of the calling function (i.e., the address to which the function should return) and any local variables of the function are located on the stack.

The scope of a local variable is exceeded by attempting to assign a long value to a local variable having a short scope. For example, a local character variable may be declared having a size of 10 characters. The scope of this local variable may be exceeded or overridden by assigning a value 100 characters long to the local variable. Doing this might not only override other local variables of the function, but may also override the return address of a function. If the return address of a function is overwritten on the stack, then when that function terminates and attempts to return, control will pass to the particular address that was written into the location of the return address of the former calling function.

Using this technique of overwriting a shorter variable on the stack with the contents of a longer variable, control can be passed to any arbitrary piece of executable code, and can potentially permit the user to gain access to the entire computer system. However, in order for this technique to work, two requirements must first be met: (1) there must be a way to control the value of the longer length variable used to overwrite the shorter variable, e.g., through an external interface such as command line arguments, environment variables, user input or text configuration files and (2) it must be known how the stack is constructed at the time the shorter variable is overwritten (i.e., overridden, with the value of the longer variable).

In order to override the stack and gain control of the system, the value of the longer length variable (i.e., the overriding variable) is chosen in such a way that the return address used by the system is not arbitrary, but rather is selected to pass control to a section of executable code that effectively grants the user virtually complete control of the computer system. The code that fills the contents of the longer length variable with code to effect control of the computer system (i.e., all permitting code) is termed the exploit program. In addition to placing the code to be executed in the longer length variable, the exploit program functions to detect the weakness in system utilities and to calculate the replacement return address to be overwritten onto the stack. The technique of building an exploit is described in more detail in the publication "Smashing the Stack for Fun and Profit" disclosed above.

Presently, there are hundreds of published exploits to most of the commercial versions of many operating system. A new exploit is published by various groups almost on a weekly basis. Note, however, that the technique of stack override is not applicable to operating systems which do not use the stack as the method of passing control to and returning from functions. Examples of such operating systems include, but are not limited to, IBM MVS, IBM VS1 and IBM VM.

As described above, computer attacks based on the technique of overriding the stack are possible due to a variety of reasons acting in combination. First, careless programming contributes to permitting the stack to be overwritten. Programming mistakes are difficult and time consuming to prevent, thus it can be assumed that for every mistake that is found and corrected, there is another one that goes undetected. Second, the stack itself is used as a mechanism for storing local variables as well as the function call return address and that to alter this fact without altering the essential functionality of the operating system is virtually impossible. Third, the stack is located in a memory segment which is executable in nature, meaning it is possible that data in the stack can be executed as code.

In connection with this third reason, most of the prior art solutions to the stack override problem attempt to make the stack non executable. However, the stack cannot be made non executable as most of the error handling, signal trapping, recovery routines, etc. are pushed onto the stack. Thus, there is no way to make the stack non executable without modifying the essential functionality of the operating system. Even if software applications could be designed to function with an operating system where the stack is non executable, legacy software would not be able to execute on new systems where the stack is no longer executable.

SUMMARY OF THE INVENTION

The present invention is a method for preventing stack override, one of the techniques utilized by computer attackers to gain control of a computer system. The method of the protection is to permit the stack to be executable but to add functionality that blocks the possibility of passing control via stack override to code inserted into the stack by means of the exploit program. This method includes relocating the entire stack to a random memory location in memory and subsequently erasing the old stack area. By moving the entire stack associated with a process to a random location, the attacker cannot predict the address in which potentially all permitting code resides and thus cannot put the correct value in the location of the return address within the stack frame. At the time the process is created, the operating system can place the stack at a random location in memory.

The stack override prevention method of the present invention is applicable to operating systems which use the stack as means for passing control to and returning from functions such as UNIX (all flavors), DOS, Windows (all flavors including windows NT), etc. In addition, the method is applicable to computer operating systems where the stack is executable. In fact very few, if any, commercial versions of operating systems which utilize the stack for passing parameters to functions, associated local variables and the data necessary to recover the previous stack frame also make the stack non executable.

Putting the stack in a random location does not prevent the attacker from overwriting the return address of a function. It prevents the attacker from guessing where the attackers code will be in the program being attacked. By not knowing where the stack code resides, the attacker does not know with what value to overwrite the return address of the function, and thus the attack is prevented.

The stack relocation method of the present invention for preventing stack override by an exploit program begins by first identifying the location and length of the stack. Once the stack length is determined, a random memory address is generated and sufficient memory is then allocated at this random memory address to hold the entire contents of the stack. The entire contents of the stack are then copied into the newly allocated memory area and the stack pointer is modified accordingly. The old stack area is then erased such as by zeroing the entire stack area. Once the old stack is erased, control is returned to the calling process.

Another method of achieving the effect of having the stack in a random location is that the operating system, when it creates a new process, chooses a random location and puts the stack in that location. This is in contrast to the previous method whereby the stack was created in a fixed location then subsequently moved to a random location in memory. An operating system can be modified according to the method of the present invention to place the stack in a random location thus defeating stack override attempts.

All the methods described hereinabove can be combined with the currently known methods of preventing stack override, such as limiting the length of command line arguments and environment variables in order to achieve a higher level of protection against stack override attacks.

There is therefore provided in accordance with the present invention, in a computer system running an operating system that utilizes executable stack memory, the stack having a stack pointer associated therewith, the stack memory located at an original location in memory and having a memory return address placed thereon, a method of preventing stack override in the computer system, the method comprising the steps of moving the contents of the stack to a block of memory located at a random memory address, modifying the stack pointer in accordance with the random memory address, and modifying the memory contents of the former stack located at the original location such that the return address no longer points to valid executable code. The step of modifying the memory contents of the former stack comprises the step of zeroing the memory contents of the former stack.

There is also provided in accordance with the present invention, in a computer system running an operating system that utilizes executable stack memory, the stack having a stack pointer associated therewith, the stack memory located at an original location in memory and having a memory return address placed thereon, a method of preventing stack override in the computer system, the method comprising the steps of determining the length of the stack, generating a random memory address, allocating sufficient memory at the random memory address to hold the stack, copying the contents of the stack to the allocated memory, modifying the stack pointer in accordance with the random memory address, and modifying the memory contents of the former stack such that the memory return address no longer points to valid executable code.

There is further provided in accordance with the present invention, in a computer system running an operating system having a kernel that utilizes executable stack memory, the stack having a stack pointer associated therewith, the stack memory located at an original location in memory and having a memory return address placed thereon, a method of preventing stack override in the computer system, the method comprising the steps of inserting a code module into the kernel portion of the operating system, the code module containing program code that functions to relocate the stack to a random portion of memory, generating and adding a user exit to the computer system from within the operating system, and executing the program code located within the code module which functions to relocate the stack.

The computer system includes environment variables and argument vector areas, and the step of executing the program code comprises the steps of generating a random offset value, subtracting the offset from the top of stack value to yield a new top of stack, copying the data lying between the original top of stack and the bottom of stack to the new top of stack, subtracting the offset value from each pointer value within the environment variables and the argument vector areas, and modifying the contents of the stack at the original location such that the memory return address no longer points to valid executable code.

In addition, the step of modifying the contents of the stack comprises the step of modifying an area of memory starting from the original top of stack or the new bottom of stack, whichever is higher, and ending at the original bottom of stack.

Further, there is provided in accordance with the present invention, in a computer system running an operating system that utilizes executable stack memory, a method of preventing stack override in the computer system, the method comprising the steps of generating a random memory address upon the invocation of a program, creating the stack at the random memory address location, and utilizing the stack created at the random memory address location during the course of execution of the program.

BRIEF DESCRIPTION OF THE DRAWINGS

The invention is herein described, by way of example only, with reference to the accompanying drawings, wherein.

DETAILED DESCRIPTION OF THE INVENTION

The stack override prevention method of the present invention is applicable to operating systems which use the stack as means for passing control to and returning from functions. Examples of such operating systems include but are not limited to UNIX (all flavors), DOS, Windows (all flavors including windows NT), and any operating system in which the stack is executable. In fact very few, if any, commercial versions of operating systems utilize the stack for passing parameters to functions, associated local variables and the data necessary to recover the previous stack frame, but make the stack non executable.

The present invention provides protection against a computer system attack that utilizes the technique of stack override to gain control of the system. The method of protection is to permit the stack to be executable but to add functionality that blocks the possibility of passing control via stack override to code inserted into the stack by means of an exploit program.

Figure 2:
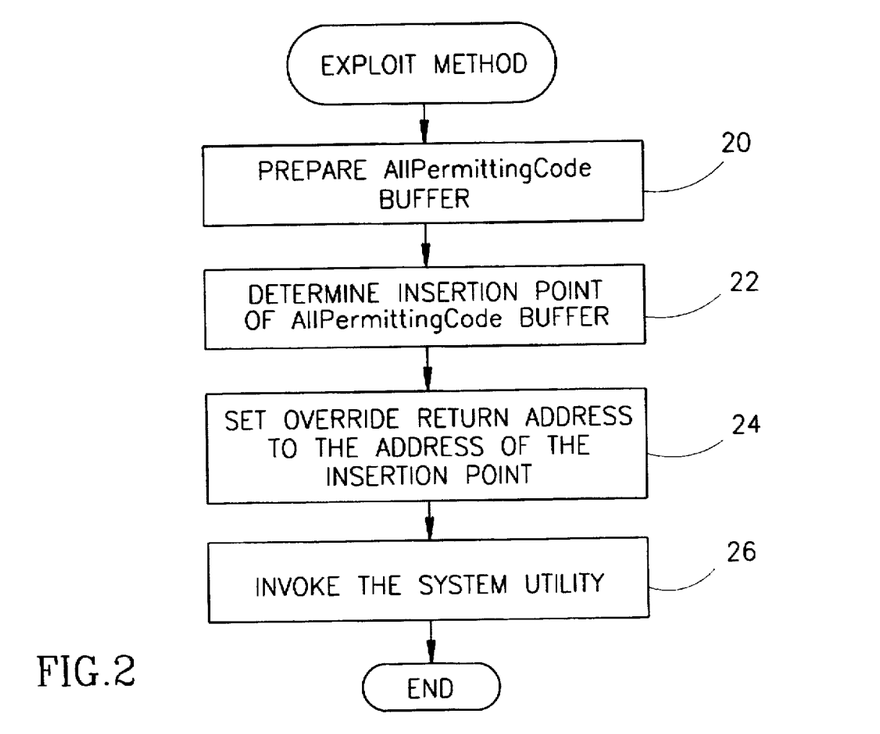
FIG. 2 is a high level flow diagram illustrating the prior art technique of creating an exploit program for corrupting the operation of a computer system.

The typical stack override attack consists of three steps. The first step is to generate the all permitting code (step 20). The all permitting code typically comprises code that functions to grant the invoker of the exploit program superuser rights and privileges. In other words, whatever a superuser or other high authorization user can do, the invoke of the exploit program can do once the stack is overridden and the inserted code is executed. Since the code is to be inserted directly into the memory of the computer, low level machine instructions or assembly code must be generated. In addition, certain system services typically must be called for the inserted code to achieve all permitting privileges and rights.

The second step is to determine where in the stack the all permitting code should be inserted (step 22). The address value used to override the original function call return address is then set equal to the address location of the insertion point in the stack (step 24). The third step in the attack is to invoke the system utility that contains the previously detected vulnerability in such a way that it will override the stack with the all permitting code including the new return address (step 26).

In operation, once the vulnerable system utility starts execution, the function to be exploited (i.e., the weak function) gains control and proceeds to override the stack with the all permitting code. This causes the function call return address to be overwritten with the address location of the beginning of the all permitting code. When the exploited function attempts a return, control passes to the all permitting code. Thus, once the exploit program is invoked, it gains control of the computer system with potential access to the entire computer system. For example, depending on the contents of the all permitting code, the exploit program may gain access to an authorization level higher than the one originally granted to it.

An illustrative example of a utility vulnerable to a stack override attack and an exploit program for implementing the stack override attack will now be presented. A listing of an example utility vulnerable to a stack override attack is shown in Listing 1 below.

---
Listing 1

Vulnerable.c

---
```
main (int argc, char **argv)
{
    f1(argv|3|)
}
f1(char *argv3)
{
    char username|20|;
    strcpy(username, argv3);
}
```
---

Vulnerable.c is a sample program that functions to accept the third argument passed to it via the command line as a user name. This program highlights the ease with which careless programming can occur which an exploit program can take advantage of. The programmer that coded this small program knew that user names cannot exceed 8 bytes and therefore assumed that allocating 20 bytes for the character variable 'username' would be more than sufficient. The common users of Vulnerable, however, never noticed any bug or weakness since they were using the program for legitimate purposes. Quite possible, none of the users ever anticipated a situation where someone would deliberately pass something longer than 20 bytes for the third argument in an attempt to cause the program to fail in a manner whereby it passes control to another code routine which was not intended by the original program (i.e., the Vulnerable program).

The detailed operation of Vulnerable is not described here since one skilled in the art of software programming could easily comprehend the operation of this simple 'C' program. Note that it is assumed that Vulnerable requires a relatively high authorization level. For example, Vulnerable may function to display the amount of space used by a user's home directory. For this purpose, Vulnerable requires authorization to open any home directory of any user, i.e., it needs to run as a superuser.

Figure 3:
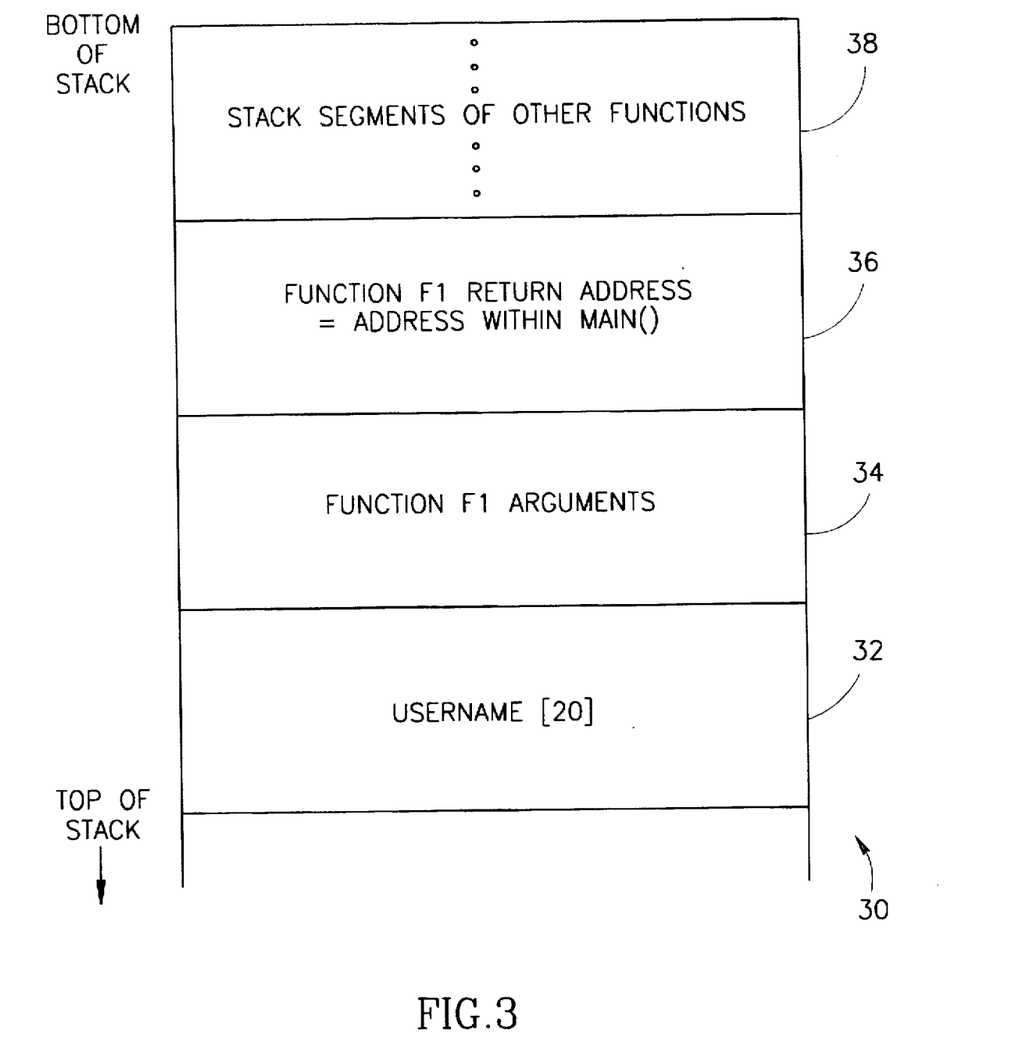
FIG. 3 is a schematic representation of the stack portion of the memory of a computer system associated with an example function.

A corresponding schematic representation of the stack segment portion of the memory of a computer system when function f1 has control is shown in FIG. 3. Before function f1 gains control, the stack segments (at 38) of previous functions further up on the calling chain are stored on the stack, which is generally referenced 30. When function f1 is called, its return address (at 36), which is some address within main( ), is stored on the stack. Following the return address, the arguments for function f1 (at 34) are then stored. Finally, storage for the automatic local variables (at 32) within function f1 is reserved. In this example, space for the character array 'username' is reserved.

An illustrative example of an exploit program that implements the stack override attack to take advantage of the weaknesses and the careless programming of a program such as the Vulnerable.c program shown above is presented below in Listing 2.

---
Listing 2

Exploit.c

---
```
main ()
{
    char AllPermittingCode|1000|;
    char OverrideData|2000|
    *   calculate where the return address of function
        f1 would be with reference to the stack;
    *   store the executable code desired to be run, e.g., code to run a
        shell, in AllPermittingCode;
    *   place the contents of AllPermittingCode
        in addition to its address into
        OverrideData such that the return address of
        function f1 is overwritten with the
        entry point address of AllPermittingCode;
    exec("Vulnerable", . . . , OverrideData)
}
```
---

Exploit.c is a program designed to exploit the weakness of the Vulnerable.c program presented above in Listing 1. The Exploit.c program prepares a long character array called OverrideData into which it stores the complete image to be overwritten onto the stack by the f1 function. The AllPermittingCode buffer contains the executable code that is desired to run. The contents of this buffer is then placed into the OverrideData buffer at the proper internal location. The address of the AllPermittingCode is then placed within the OverrideData buffer such that that the return address of function f1 will be overwritten with the address of the AllPermittingCode.

When the Vulnerable program is run, since the Vulnerable program does not perform any checks on the length of username, the strcpy function performed in function f1 will overwrite the return address of function f1 on the stack. When the return from function f1 is encountered, control passes to the all permitting code. If the all permitting code is shell invocation code, the invoke of the Exploit program gains access to a shell at the same privilege level associated with the Exploit program. If the Vulnerable program runs with high privilege, e.g., superuser level, the invoke of the Exploit program gains access to a shell having the same superuser level.

Figure 4:
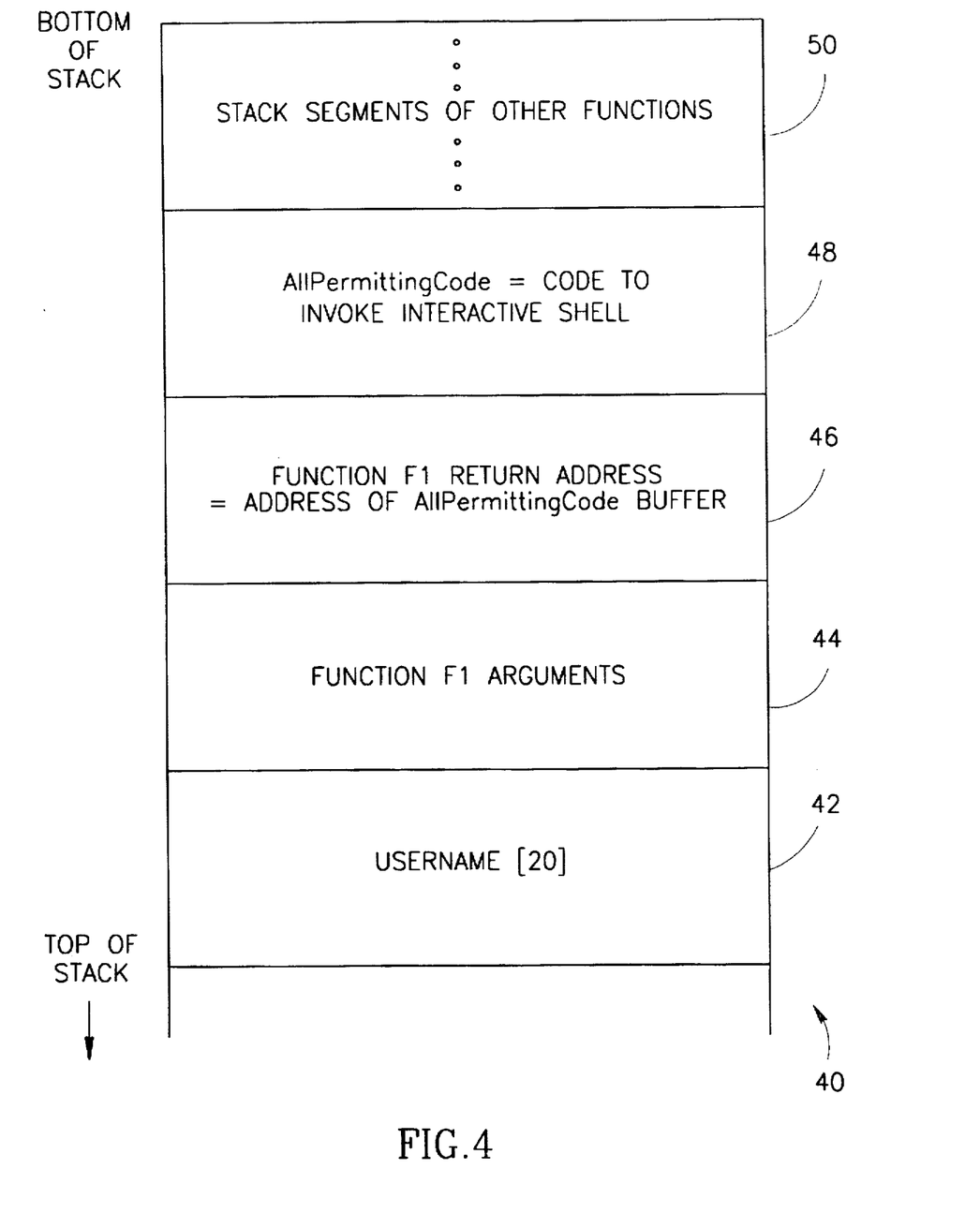
FIG. 4 is a schematic representation of the stack portion of the memory of a computer system associated with an example function that has been corrupted by an exploit program.

A corresponding schematic representation of the stack portion of the memory of a computer system associated with the Vulnerable program which has been corrupted by the Exploit program is shown in FIG. 4. Before function f1 gains control, the stack segments (at 50) of previous functions further up on the calling chain are stored on the stack, which is generally referenced 40. The execution of main( ) causes the AllPermittingCode buffer to be stored on the stack (at 48). As described previously, this buffer holds the executable code desired to be executed, e.g., code for invoking a shell. When function f1 was originally called, its return address was stored on the stack. However, the execution of function f1 causes the original return address to be overwritten with the address of the AllPermittingCode buffer (at 46). Following the return address, the arguments for function f1 (at 44) are then stored. Finally, storage for the automatic local variables (at 42) within function f1 is reserved. In this example, space for the character array 'username' is reserved.

The proposed solution to the stack override attack described above is based on the observation that the attacker, when creating the override data buffer, has knowledge of or is able to compute the memory address in which the all permitting code will reside in the vulnerable program. The memory address in which the all permitting code will reside in the vulnerable program must be known in order to set the return address to the all permitting code. By moving the entire stack of the process to a random location, the attacker cannot predict the address in which the all permitting code resides in the vulnerable program and thus cannot put the correct value in the location of the return address.

Figure 5:
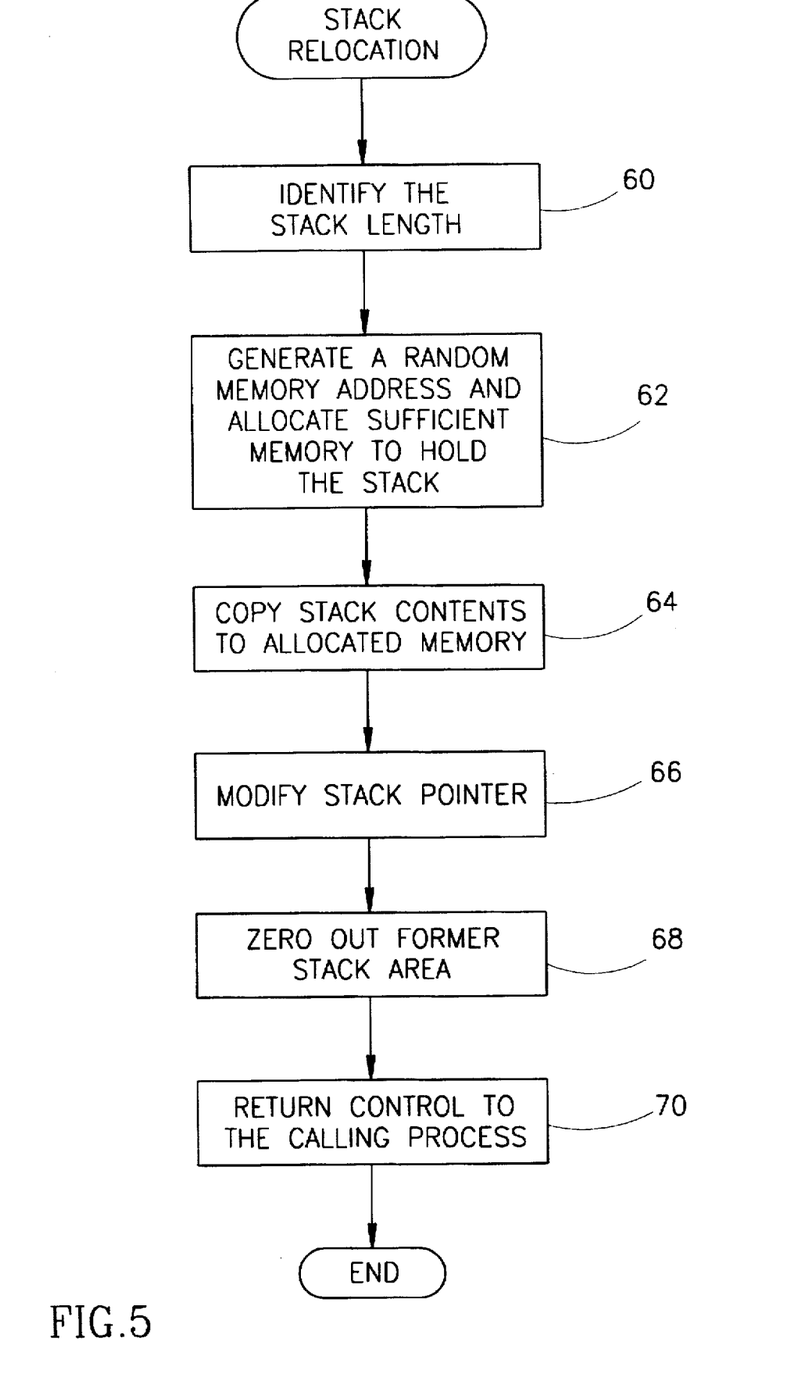
FIG. 5 is a high level flow diagram illustrating the stack relocation method of the present invention for preventing stack override by an exploit program.

A high level flow diagram illustrating the stack relocation method of the present invention for preventing stack override by an exploit program is shown in FIG. 5. The first step is to identify the location and length of the stack (step 60). Once the stack length is determined, a random memory address is generated and sufficient memory is then allocated at this random memory address to hold the entire contents of the stack (step 62). Then the entire contents of the stack are copied into the newly allocated memory area (step 64). The stack pointer is then modified in accordance with the random memory address generated in step 62 (step 66). The old stack area is erased such as by zeroing the entire stack area (step 68). Once the old stack is erased, control is returned to the calling process (step 70).

Figure 6:
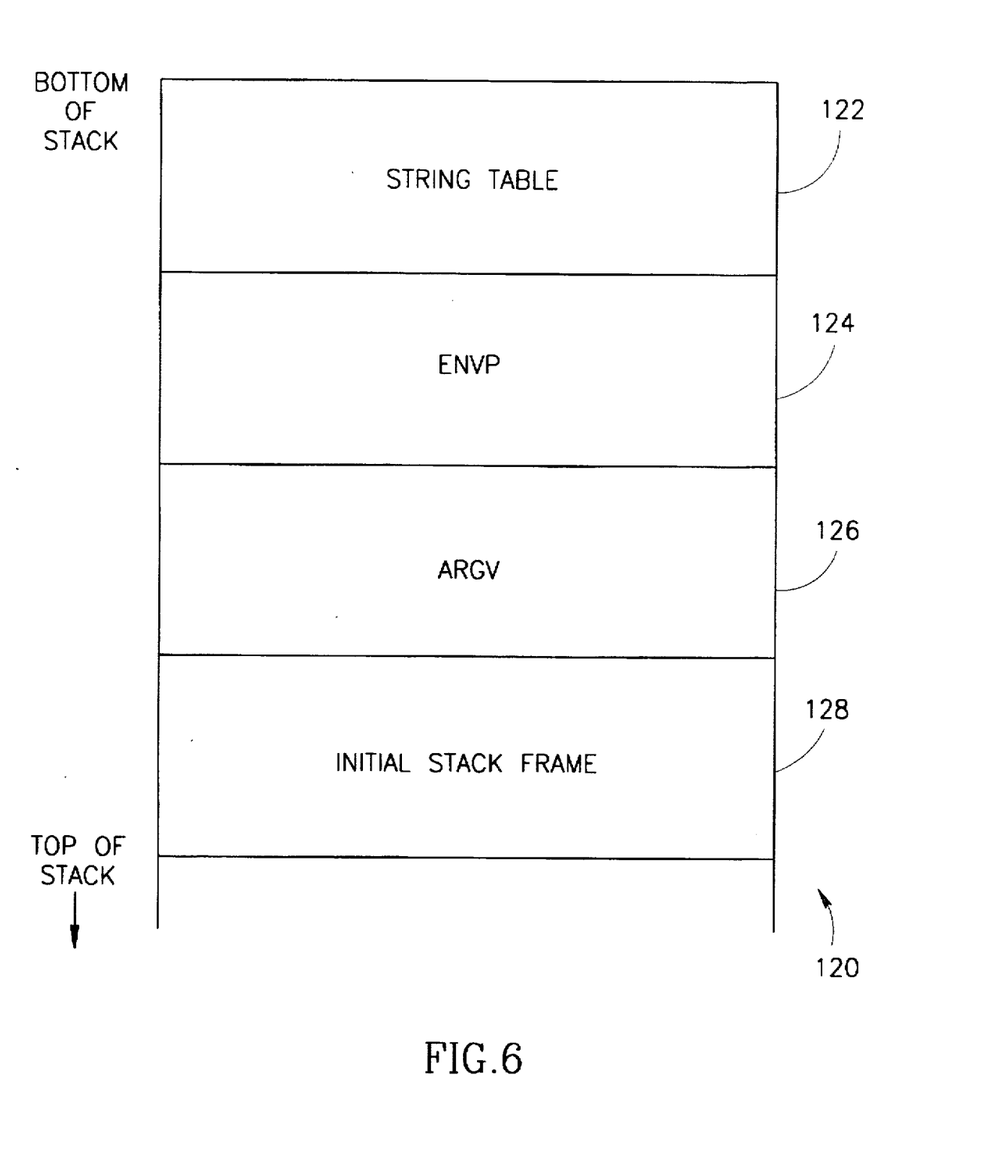
FIG. 6 is a schematic representation of the stack portion of the memory of a computer system after the exec system call.

For the purpose of describing the present invention, the operation of the stack relocation method will be described with reference to the Solaris x86 operating system version 2.5.1. In the Solaris operating system, the system calls 'exec' and 'execve' are used to invoke a program. The description presented hereinbelow refers only to the exec system call. The behavior of the execve system call is, however, identical. The exec system call replaces the address space of the process with the contents of the program, initializes the stack and registers and arranges for the process to start executing from the first instruction in the program. The format of the stack region after the exec system call is performed is shown in FIG. 6. The bottom of the stack (the stack portion of memory generally referenced 120) resides in the address specified by the symbol USRSTACK and has the value of 0×804800. The stack grows in the direction from high memory addresses to low memory addresses. Thus, all the objects on the stack are in memory addresses lower than USRSTACK.

The first object placed on the stack initially, is the string table 122. The string table contains the values of the command line arguments and the environment variables. The string table is followed by the environment pointers area (envp) 124 which is a list of pointers to those strings in the string table that are the values of environment variables. The environment pointer area is followed by the arguments vector (argv) 126 which is a list of pointers to the values of the command line arguments in the string table. The last object on the initial stack is a stack frame 128 for the first function of the program.

The top of the stack is indicated by the user mode stack pointer (SP) register. The initial contents of all the user registers is stored in the 'lwp' register array. The 'u' structure of the process holds two pointers into the stack. One of these pointers is 'u_argv' which points to the arguments vector and the other pointer is 'u_envp' which points to the environment pointer. Both these pointers are used by debuggers and system utilities to process the process' arguments and environment variables. These pointer values are used only for debugging and serve no other purpose.

To relocate the stack, a module is inserted into the kernel portion of the computer operating system. A user exit is added to the operating system using a method such as described in U.S. patent application Ser. No. 08/538,537, filed Oct. 3, 1995 and entitled APPARATUS FOR AND METHOD OF PROVIDING USER EXITS ON AN OPERATING SYSTEM PLATFORM, incorporated herein by reference.

The user exit calls the function move_stack when the system's exec function returns. The pseudo code for the function move_stack is presented in Listing 3 below.

---
Listing 3
--- move_stack()
{
- generate a random number;
- define an offset value equal to the generated random number;
- new top of stack = the current top of stack minus the offset;
- copy all data lying between the original top of stack
  and the bottom of stack to the new top of stack of location;
- subtract the offset value from the values
  of u.u_argv and u.u_envp;
- scan the environment pointers and the
  argument vector (pointed to by the new values of
  u.u_envp and u.u_argv, respectively)
  and subtract the offset value from each pointer in these areas;
- zero the contents of the original stack (the area to
  be zeroed starts at either the
  original top of stack or the new bottom of stack, whichever is higher,
  and ends at the original bottom of stack)
}

---

Moving the stack to a random location effectively nullifies the all permitting code since the return address that was overwritten onto the stack in place of the original function f1 return address will no longer point to valid executable code. Thus, any attempt to pass control to the now zeroed out stack area will, on the majority of computer platforms, trigger a machine exception. Even knowing that the stack is relocated does not help the attacker as there is no way for the attacker to know in advance what would be the new location of the stack. Thus, the attacker cannot generate the override data in a way such that the value of the return address points to the location of the all permitting code.

Several possible alternative methods of relocating the stack will now be described. One alternative method of relocating the stack is to modify and replace the startup code (found in the file 'crt0.o' on most UNIX and UNIX like operating systems). Another method is to modify and replace the dynamically linked library loader, e.g., 'ld.so' on the Solaris operating system. The modifications required in both cases are as described above with the exception that both u.u_argv and u.u_envp cannot be modified.

Another alternative method of relocating the stack is for the operating system to initially create the stack in a random location. This approach is described with reference to the NetBSD operating system.

The symbol USRSTACK represents the memory address of the bottom of the stack. Since the stack is to be in a random location, the symbol is replaced with the random address generated. The process control block ('proc' structure) contains a member that holds the address of the bottom of stack associated with that particular process control block. Whenever a program is invoked, a new random value is generated and stored in this member. Each reference to the USRSTACK symbol is replaced with a reference to the bottom of stack of the relevant process. Using this method, the stack is effectively created in a new location each time the process executes a program.

Figure 7:
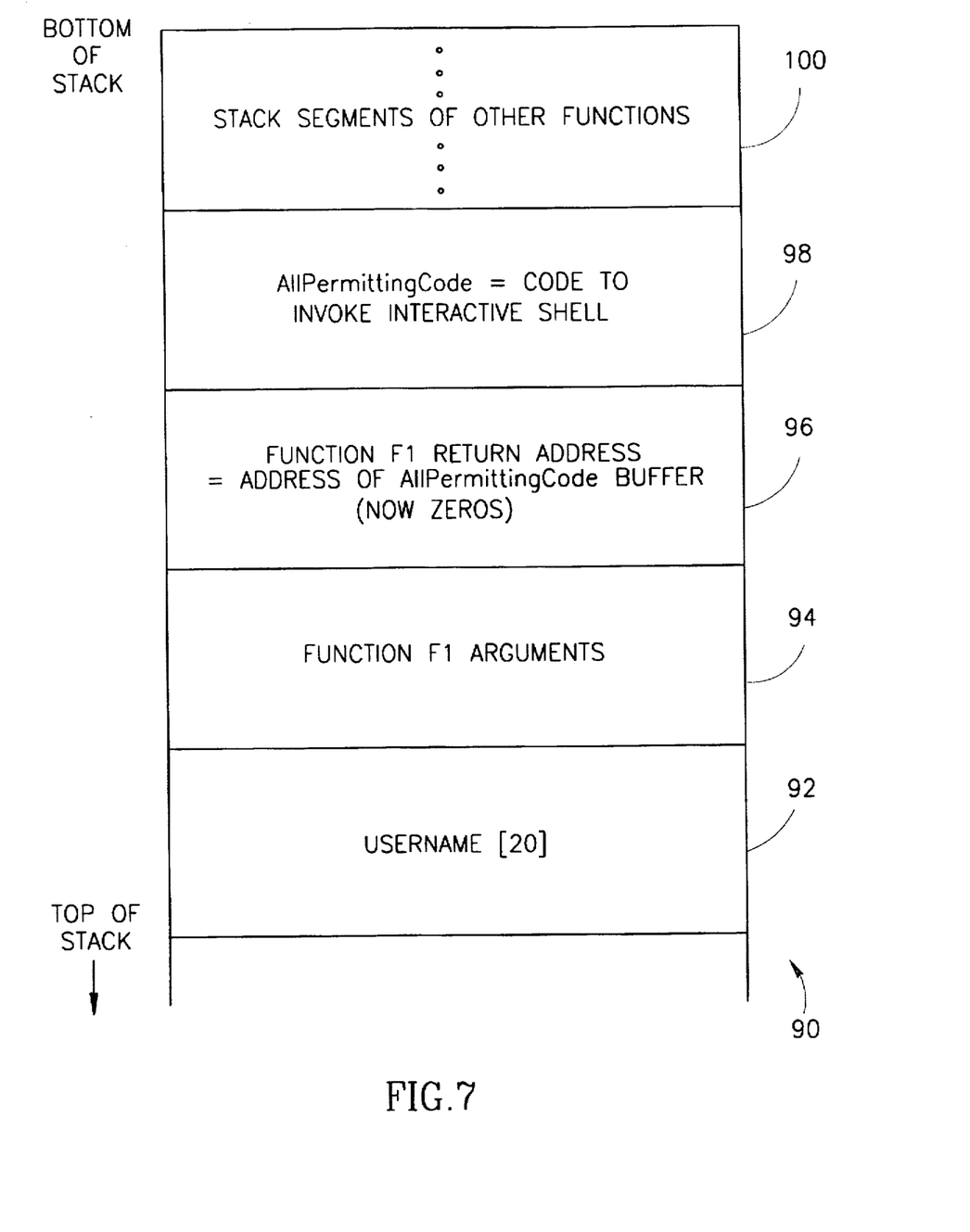
FIG. 7 is a schematic representation of the stack portion of the memory of a computer system after execution of the stack relocation method of the present invention.

A schematic representation of the stack portion of the memory of a computer system after execution of the stack relocation method of FIG. 5 is shown in FIG. 7. The stack area, generally referenced 90, is shown after the Vulnerable program is invoked by the Exploit program More specifically, the stack area 90 of FIG. 7 refers to a point where function f1 has gained control and the strcpy( ) statement has finished executing. Before function f1 gained control, the stack segments (at 100) of previous functions further up on the calling chain are stored on the stack. The execution of main( ) causes the AllPermittingCode buffer to be stored on the stack (at 98). As described previously, this buffer holds the executable code desired to be executed, e.g., code for invoking a shell. When function f1 was originally called, its return address was stored on the stack. However, the execution of function f1, specifically the strcpy( ) statement, causes the original return address to be overwritten with the address of the AllPermittingCode buffer (at 96). Following the return address, the arguments for function f1 (at 94) are then stored. Finally, storage for the automatic local variables (at 92) within function f1 is reserved. In this example, space for the character array 'username' is reserved.

However, before the return in executed, the stack is relocated to a random memory location and the old stack is erased or zeroed out. When function f1 attempts to return control to main( ), control still passes to the AllPermitting-Code buffer address originally overwritten onto the stack. This buffer memory address corresponds to an address on the original stack. The buffer memory at this address, however, now contains all binary zeros. This virtually guarantees that an error condition will be generated due to execution of an 'Illegal Instruction' and the routine will fail. As a result, although an error condition was generated, the Exploit program was not able to gain control of the computer system, thus is no longer useful to a would be attacker.

While the invention has been described with respect to a limited number of embodiments, it will be appreciated that many variations, modifications and other applications of the invention may be made.

What is claimed is:

1. In a computer system including an operating system executable thereon, a program executable under said operating system, a stack associated with said program, said stack composed of memory that is executable, said stack having a stack pointer associated therewith, said stack memory located at a first location in memory and having a memory return address placed thereon, a method of preventing stack override in the computer system, said method comprising the steps of:

moving the contents of the stack to a second location in memory, said second location being a random memory address, the contents of said stack being moved intact;

modifying said stack pointer in accordance with said random memory address;

modifying the memory contents of the former stack located at said first location such that no executable code remains therein; and wherein upon each launch of said program a new random memory address is generated and the contents of said stack moved in accordance thereto.

2. The method according to claim 1, wherein said step of modifying the memory contents of the former stack comprises the step of zeroing the memory contents of the former stack.

3. In a computer system including an operating system executable thereon, a program executable under said operating system, a stack associated with said program, said stack composed of memory that is executable, said stack having a stack pointer associated therewith, said stack memory located at a first location in memory and having a memory return address placed thereon, a method of preventing stack override in the computer system, said method comprising the steps of:

determining the length of the stack;

generating a random memory address, wherein upon each launch of said program a new random memory address is generated;

allocating sufficient memory at said random memory address to hold the stack having said length;

copying the contents of the stack intact to said allocated memory;

modifying said stack pointer in accordance with said random memory address; and modifying the memory contents of the former stack at said first location such that no executable code remains therein.

4. The method according to claim 3, wherein said step of modifying the memory contents of the former stack comprises the step of zeroing the memory contents of the former stack.

5. In a computer system including an operating system having a kernel executable thereon, an application program executable under said operating system, a stack associated with said application program, said stack composed of memory that is executable, said stack having a stack pointer associated therewith, said stack memory located at a first location in memory and having a memory return address placed thereon, a method of preventing stack override in the computer system, said method comprising the steps of:

inserting a code module into the kernel portion of the operating system, said code module containing program code that functions to relocate the stack to a random location in memory, wherein upon each launch of said application program a new random location is generated by said program code;

generating and adding a user exit to the computer system from within the operating system;

executing said program code located within said code module which functions to relocate the stack; and wherein the stack is relocated intact.

6. The method according to claim 5, wherein said computer system includes environment variables and argument vector areas, wherein said step of executing said program code comprises the steps of:

generating a random offset value;

subtracting said offset from the top of stack value to yield a new top of stack;

copying the data lying between the original top of stack and the bottom of stack to said new top of stack;

subtracting said offset value from each pointer value within the environment variables and the argument vector areas; and modifying the contents of the stack at the original location such that said memory return address no longer points to valid executable code.

7. The method according to claim 6, wherein said step of modifying the contents of the stack comprises the step of modifying an area of memory starting from the original top of stack or the new bottom of stack, whichever is higher, and ending at the original bottom of stack.

8. The method according to claim 6, wherein said step of modifying the contents of the stack comprises the step of zeroing the memory contents of the former stack.

9. In a computer system including an operating system executable therein, a program executable under operating system, a stack associated with said program said stack composed of memory that is executable, a method of preventing stack override in the computer system, said method comprising the steps of:

generating a random memory address upon the invocation of said program, wherein upon each invocation of said program a new random memory address is generated;

creating the stack at said random memory address location; and utilizing the stack created at said random memory address location during the course of execution of said program.

\* \* \* \* \*